United States Patent
Morgante et al.

(10) Patent No.: US 6,914,410 B2
(45) Date of Patent: Jul. 5, 2005

(54) ELECTRIC DIFFERENTIAL TRACTION-CONTROL DRIVE SYSTEM

(75) Inventors: John C. Morgante, Noblesville, IN (US); Theodore E. Demers, Commerce Township, MI (US); Daniel D. Richey, New Castle, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/607,953

(22) Filed: Jun. 27, 2003

(65) Prior Publication Data

US 2004/0263112 A1 Dec. 30, 2004

(51) Int. Cl.[7] .................................................. H02P 5/34
(52) U.S. Cl. .............................. 318/801; 318/3; 318/14
(58) Field of Search ................................. 310/179, 432; 318/801, 3, 14, 600, 717, 721, 538; 388/800

(56) References Cited

U.S. PATENT DOCUMENTS

| | | | | |
|---|---|---|---|---|
| 3,578,873 A | * | 5/1971 | Baez | 415/68 |
| 4,782,257 A | * | 11/1988 | Secher et al. | 310/114 |
| 5,647,321 A | * | 7/1997 | Ichikawa et al. | 123/399 |
| 6,153,959 A | * | 11/2000 | Lorenzo | 310/162 |
| 2001/0035049 A1 | * | 11/2001 | Balch et al. | 73/488 |
| 2003/0067234 A1 | * | 4/2003 | White et al. | 310/112 |
| 2003/0080729 A1 | * | 5/2003 | Das | 324/166 |

* cited by examiner

*Primary Examiner*—Karen Masih
(74) *Attorney, Agent, or Firm*—Christopher DeVries (57) ABSTRACT

In an electrical drive system, an electric differential comprises a first rotor for driving a first drive wheel, a second rotor for driving a second drive wheel, the first and second rotors capable of independent relative rotation, and a common stator for driving the first and second rotors. The common stator may comprise a single winding for driving both rotors or first and second windings for driving the first and second rotors respectively. A processor and a sensor system monitor parameters such as torque, speed, magnetic flux, etc. to detect the loss of traction by one or both drive wheels and adjust the operation of the motor until traction is regained.

21 Claims, 5 Drawing Sheets

FIG. 1

-PRIOR ART-

ELECTRIC DIFFERENTIAL TRACTION-CONTROL DRIVE SYSTEM

TECHNICAL FIELD

This invention relates generally to a vehicular drive system and, more particularly, to an electric differential traction system for use in a vehicle.

BACKGROUND OF THE INVENTION

Since their inception, drive wheel dependent vehicle architectures have sought to improve the efficiency of power transfer from a set or sets of drive wheels to a given surface through traction enhancement. Traction (i.e., the ability of a given drive wheel to contact and transfer power to a given surface) directly impacts certain aspects of vehicular performance such as maneuverability of vehicle, fuel efficiency, accelerative torque distribution, deceleration, and/or special braking effectiveness. Most importantly perhaps, the greater the drive wheel traction of the vehicle, the more control an operator may exercise over the vehicle. Thus, maximizing traction is not only an important factor in maximizing vehicular performance, but it also provides a reliable and safer vehicle under all driving conditions.

Maintaining traction became problematic in earlier vehicular architectures when executing a turn. Specifically, traction was compromised when the front drive wheels of a vehicle, each spacially fixed apart relative to each other and coupled together by a common rotor, were required to travel unequal distances. For example, the relative paths of the frontal drive wheels of a two-wheel drive vehicle executing a turn can be conceptualized as two circles of different diameters. The non-drive wheels need not be considered in this example because they are allowed to rotate freely. During a right turn, the circular path of the left wheel is characterized as having a larger diameter than the circular path of the right drive wheel. Thus, the left drive wheel must travel a greater distance than would the right drive wheel. Unfortunately, earlier vehicular architectures required an equivalent rotational frequency or angular velocity to be present in both drive wheels at all times. A loss of traction, or wheel slippage, during a turn consequently occurred as both drive wheels, rotating at an equal frequency, were required to travel unequal distances. This problem was mitigated with the creation of the mechanical, gear-oriented differential, whereby a first drive wheel was permitted to rotate at a different rate with respect to a second drive wheel. This provided a reasonable solution to maintaining drive wheel traction during a turning action. Shortly thereafter, mechanical differentials became commonplace in vehicular design.

Unfortunately, the structure of the conventional mechanical differential operates such that the drive wheel with the lowest coefficient of traction limits the traction available to the other drive wheel. That is, if the first wheel is allowed to spin freely without providing a significant amount of traction, its counterpart drive wheel will remain virtually stationary. Thus, a worst-case traction scenario is created if only one of the two drive wheels looses traction in a two-wheel drive vehicle.

In more recent years, it became clear that it would be desirable to provide a second set of drive wheels. This significantly increased total traction. If the front drive wheels are capable of being engaged or disengaged by the operator, the vehicle is of the four-wheel drive type. If all drive wheels remain powered at all times, the vehicle is of the all-wheel drive type. For the aforementioned reasons, it is common practice that all-wheel drive systems utilize a first mechanical differential between the front drive wheels and a second mechanical differential between the rear drive wheels.

Regrettably, all-wheel drive and front-wheel drive systems exhibit several undesirable characteristics unique to their mechanical design. Amongst these are the inability to produce a regenerative breaking action and an inability to be disconnected during an Automatic Braking System (herein after ABS) breaking event. Furthermore, mechanical all-wheel drive systems require a drive-shaft tunnel extending the length of longitude in the wheel base, adding significant mass to the vehicle, decreasing fuel efficiency, and increasing the probability of mechanical failure. Ultimately, four-wheel and all-wheel driven vehicles, while improving vehicular performance through traction enhancement, are still limited by the conventional mechanical differential they employ.

A worst-case traction scenario arises on a four-wheel or all-wheel driven vehicle when one or both of the front wheels maintains tractions while one or both of the rear drive wheels looses traction. Unfortunately, such situations occur frequently without any means of counteracting or compensating for lost traction. Such a compromise in traction may occur anytime the vehicle contacts a surface having a split coefficient of friction, i.e., one drive wheel contacts a surface having a first coefficient of friction and a second drive wheel contacts a surface having a second, different coefficient of friction. A split-coefficient surface may be produced by natural elements such as snow, sleet, ice, rain, and or patches of dirt or gravel, or by synthetic elements such as through spillage of viscous fluids, such as oil. When encountering such a split coefficient surface, a loss of traction is generally experienced by the vehicle, thus compromising performance and control.

One known way to counter this problem involves coupling an individual motor to each drive wheel, thereby permitting each drive wheel to operate independently of the others, altering its angular velocity as conditions necessitate. Thus, a vehicle experiencing a loss of traction with a singular front-wheel and a singular back-wheel could effectively redistribute torque to the gripping wheels. Alternatively, a second innovation became known that acts similarly to a simple mechanical differential but with further able to sense a loss in traction and distribute torque accordingly. However, this torque sensing ("Torsen") differential and the after mentioned independent traction motors both suffer from several significant disadvantages inherent in their mechanical nature. The complex machinery of the "Torsen" differential or the addition of weighty independent traction motors to a vehicle both degrade vehicular performance and operator control. Additionally, disadvantages of the mechanical differential systems include, but are by no means limited to, increased manufacturing costs, substantial maintenance costs, decreased mechanical reliability (e.g., and increased probability of mechanical failure and vehicular break-down), and due to the substantial weight increase, loss of fuel efficiency and degradation of vehicular maneuverability.

In view of the foregoing, it should be appreciated it would be desirable to provide an improved apparatus capable of creating a differential angular velocity between two given drive wheels for use in a vehicle. In an all-wheel vehicle system, it would be of additional benefit if torque could be created rather than distributed over both sets of drive wheels. Finally, it would be desirable to provide an automotive electrical differential system capable of being disconnected during an ABS braking event and/or producing a regenerative braking action. Additional desirable features will become apparent to one skilled in the art from the foregoing background of the invention and the following detailed description of a preferred exemplary embodiment and the appended claims.

SUMMARY OF THE INVENTION

In accordance with a first aspect of the invention, an electric differential comprises a first rotor for driving a first drive wheel, a second rotor for driving a second drive wheel, the first and second rotors capable of independent relative rotation, and a common stator for driving the first and second rotors. The common stator may comprise a single winding for driving both rotors or first and second windings for driving the first and second rotors respectively. A processor and a sensor system monitor parameters such as torque, speed, magnetic flux, etc., to detect the loss of traction by one or both drive wheels and adjust the operation of the motor until traction is regained.

BRIEF DESCRIPTION OF THE DRAWINGS

The following drawings are illustrative of particular embodiments and therefore do not limit the scope of the invention, but are presented to assist in providing a proper understanding. Drawings are not to scale (unless as stated) and are intended for use in conjunction with the explanations of the following detailed description. The present invention will hereinafter be described in conjunction with the appended drawings, wherein like reference numerals denote elements, and.

DESCRIPTION OF THE EXEMPLARY EMBODIMENT

The following description is exemplary in nature and is not intended to limit to scope, applicability, or configuration of the invention in any way. Rather, the following description provides a convenient illustration for implementing an exemplary embodiment of the invention. Various changes to the described embodiment may be made in the function and arrangement of the elements described herein without departing from the scope of the invention.

Figure 1:
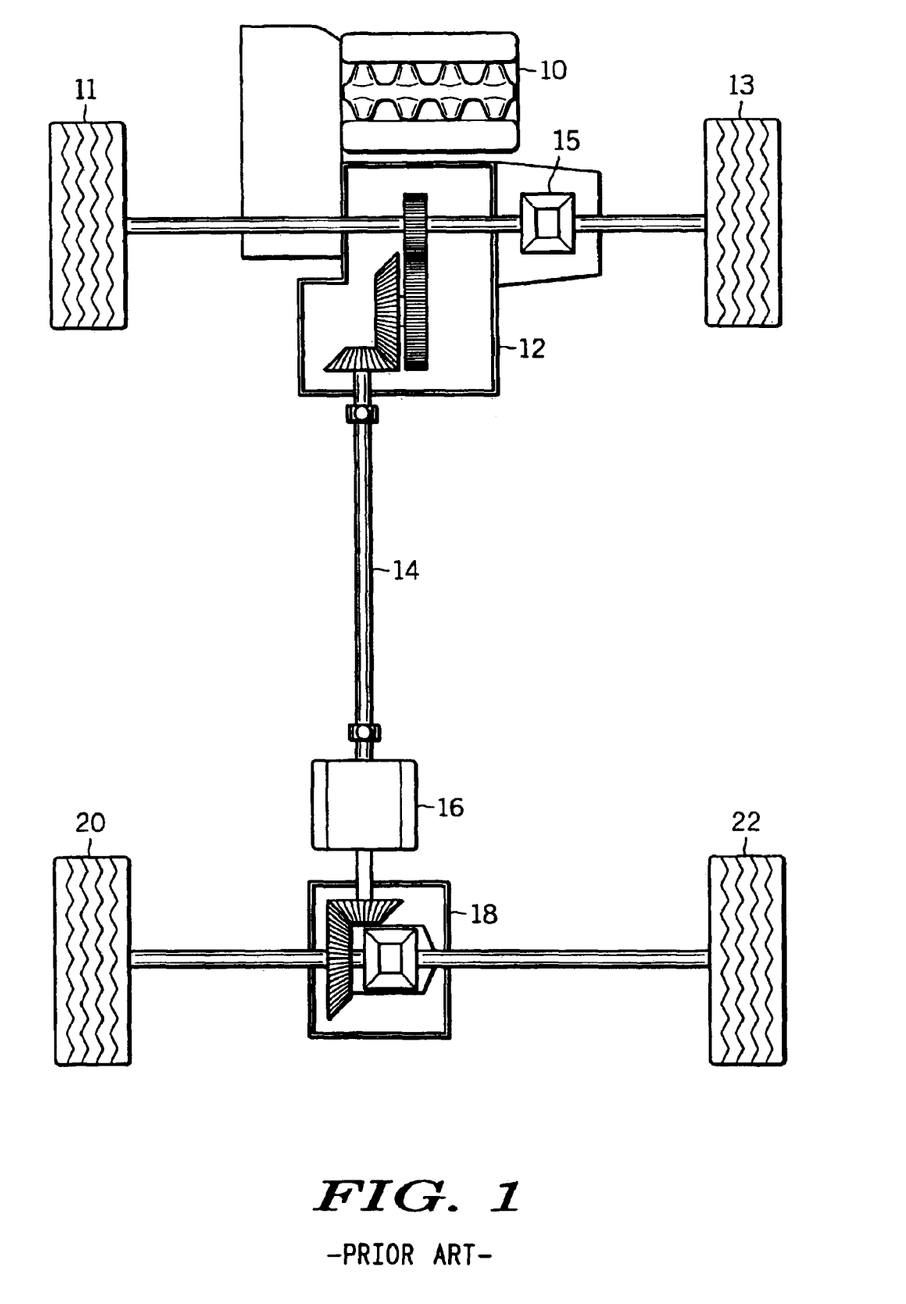
FIG. 1 is an overhead skeletal view of a conventional all-wheel drive system in accordance with the prior art.

FIG. 1 is an overhead skeletal mechanical view of a conventional mechanical all-wheel drive system. It comprises an engine 10 which when operating drives gear assembly 12. Gear assembly 12 drives wheels 11 and 13 by means of mechanical differential 15 and permits them to rotate at different angular velocities relative to each other as described above. Gear assembly 12 is coupled to drive shaft 14 which in turn is coupled to viscous drive unit 16. Viscous drive 16 activates rear differential 18 in the well known manner. That is, viscous drive 16 may include a silicon-based fluid that congeals in the presence of heat. As the angular velocity of shaft 14 increases relative to rear differential 18, friction generated heat causes the fluid of viscous drive 16 to thicken resulting in an increased power transmission to rear differential 18. Rear differential 18 drives wheels 20 and 22 in the well known manner.

Figure 2:
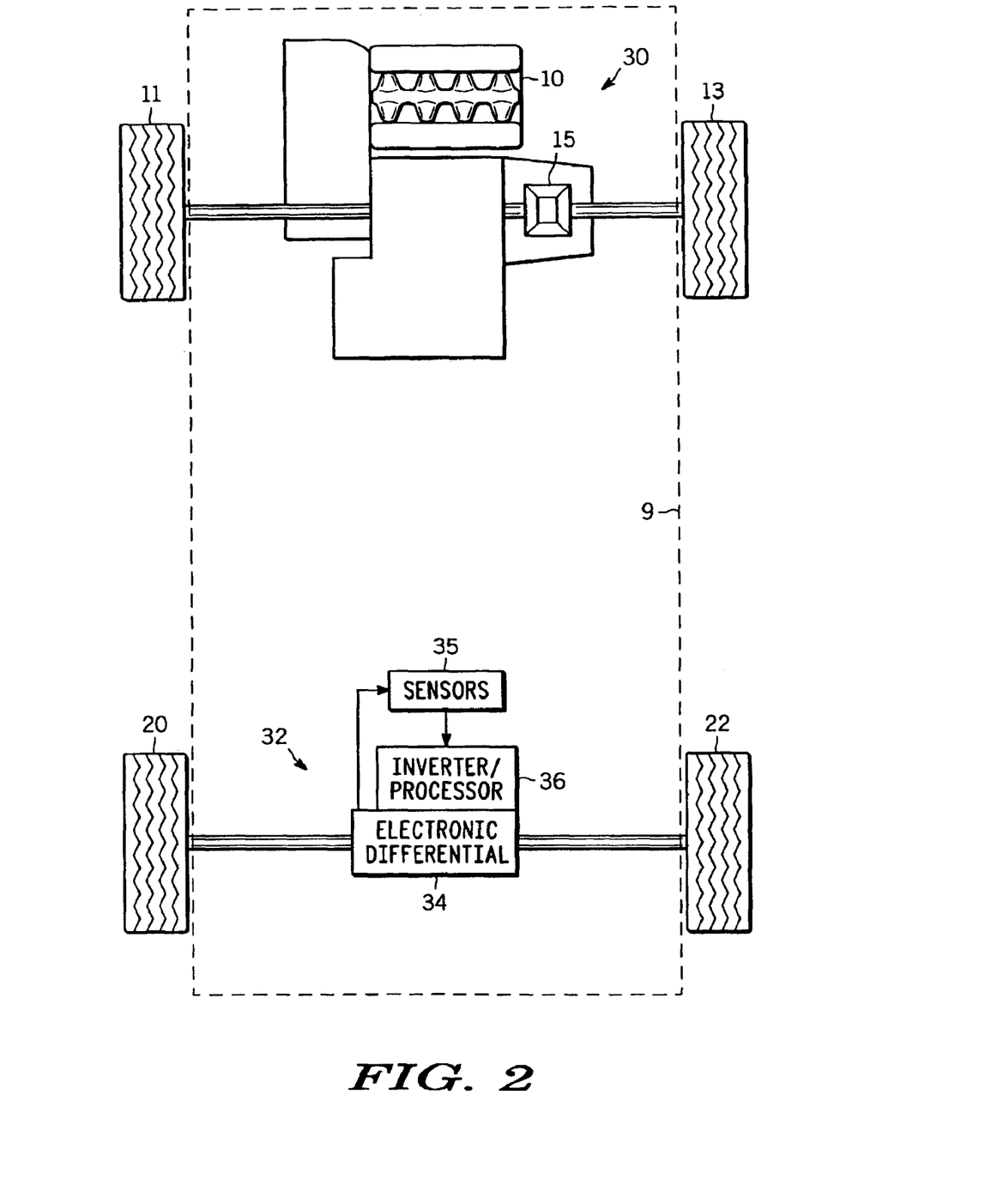
FIG. 2 is an overhead skeletal mechanical view of an all-wheel drive system incorporating the electric differential of the present invention.

FIG. 2 is an overhead skeletal mechanical view of the inventive electric traction-control differential drive system 9 wherein upper portion 30 represents a conventional front-wheel drive system and lower portion 32 represents the inventive all-wheel drive system utilizing an electric differential in accordance with the present invention. Conventional front-wheel drive system 30 operates as was previously described in connection with FIG. 1. However, the conventional drive-shaft 14, viscous drive 16, and rear mechanical differential 18 for driving wheels 20 and 22 have been replaced by an electric differential assembly 34 which is controlled by inverter/processor 36.

Figure 3:
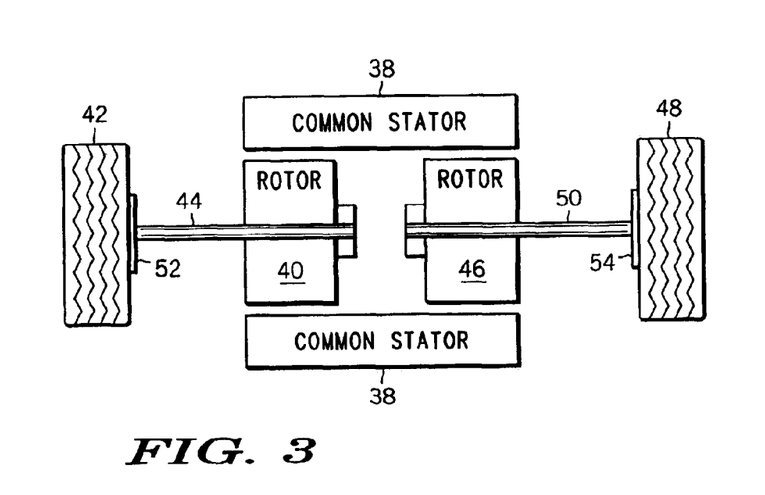
FIG. 3 is a cutaway view of the inventive electric differential.
Figure 4:
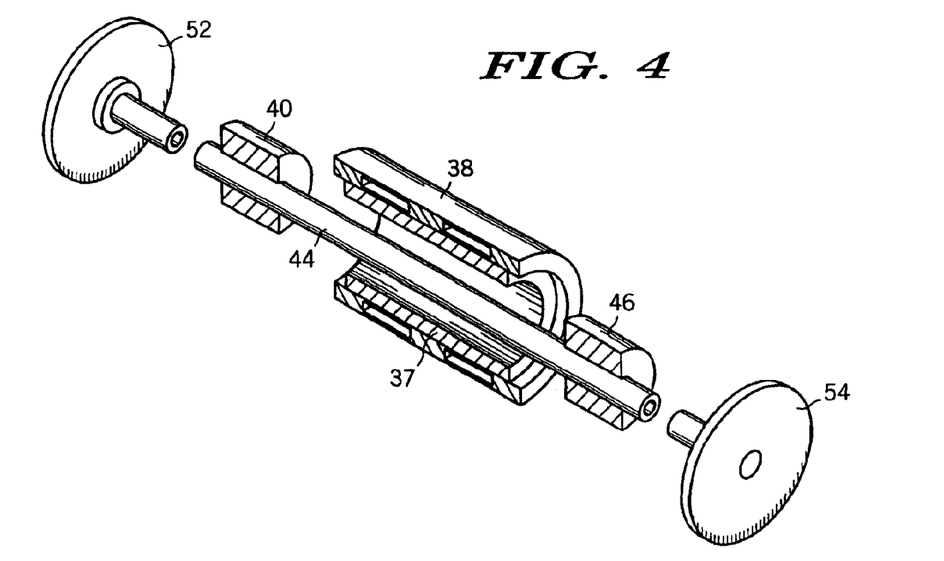
FIG. 4 is an isometric, cutaway exploded view of the inventive electric differential.

Electric differential assembly 34 is shown in more detail in FIG. 3 and in the isometric, cutaway, exploded view of FIG. 4. Referring to these figures, it can be seen that the inventive electrical differential includes a common single or dual winding stator 38, a first rotor 40 for driving wheel or tire 42 via axle 44, and a second rotor 46 for driving wheel or tire 48 via axle 50. As can be seen, axles 44 and 50 are coupled respectively to wheels 42 and 44 by means of end plates 52 and 54, respectively.

Electric differentials have two primary functions. First, they transmit power from a single power source to first and second drive axles 44 and 50. Second, the electric differential permits independent rotation of the two driven axles 44 and 50 (i.e., differentiation). This is accomplished by applying independent power to both axles 44 and 50 by means of two separate rotors 40 and 46 respectively. The electric differential also provides its own propulsion power; i.e. it is its own dual power source. It provides a compromise between these two functions so as to enable an increase in the total amount of torque which can be conveyed to the drive axles under all tractions conditions without unduly restricting differentiation.

There are two types of torque transfers in a differential. First, there is a transfer of torque from a single power source (motor/engine) to the drive axles. Second, there is a transfer of torque between drive axles. In a common conventional differential of the type shown in FIG. 1, the maximum amount of torque conveyed by the drive axles collectively is limited to approximately two times the amount of torque supported by the drive wheel having the least traction. It is an important function of the inventive electric differential to control torque transfers between the drive axles and thereby enhance the capacity of the differential to transfer an increased amount of torque to the drive axles collectively. The inventive electric differential addresses this by providing torque proportioning characteristics between drive axles 44 and 50 through use of a common and continuously variable stator field and two independent rotors 40 and 46. This provides for a wide range of torque ratios between the two drive axles; i.e., 1:1 to 10:1. The maximum torque ratio supported by a particular differential design is termed the bias ratio. This term is expressed as the quotient of the torque in the axle experiencing the higher torque divided by the torque in the axle experiencing the lower torque.

Figure 5:
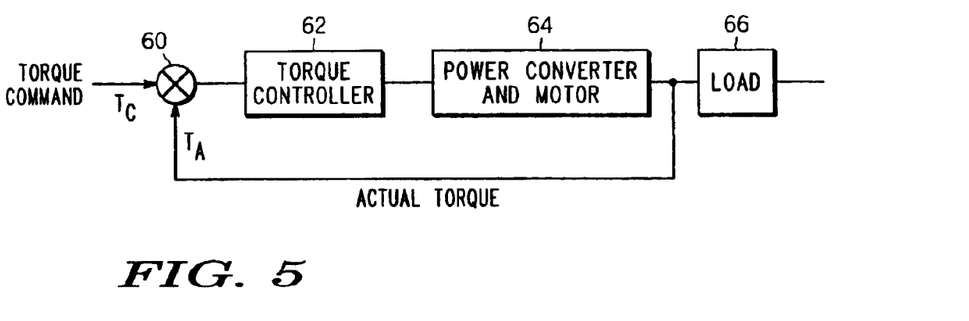
FIG. 5 is a block diagram of a closed-loop torque-control drive system.

FIG. 5 is a block diagram of a drive system having closed loop torque control and suitable for use in conjunction with the present invention. As can be seen, a torque command signal $T_c$ is applied to a first input of comparator 60 where it is compared with the actual torque $T_A$ which is determined from measured electrical quantities such as current and flux in the well known manner. An error signal is generated by comparator 60 and is applied to an input of torque controller 62. Torque controller 62 amplifies the error signal and applies a compensating transfer function to power converter and motor 64. The output of power converter and motor 64 is applied to load 66 (e.g., wheel 42) and is also fed back to comparator 60 for comparison with torque command $T_c$ as previously described.

Figure 6:
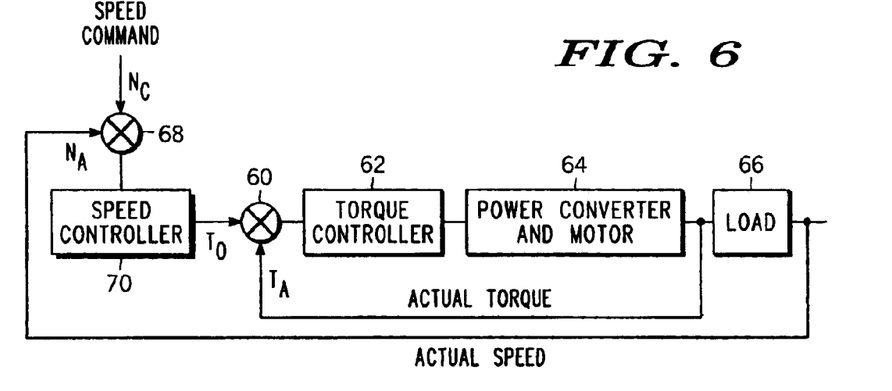
FIG. 6 is a block diagram of a closed-loop speed control system.

An outer speed loop can be added to the torque loop shown in FIG. 5 in order to provide an adjustable speed drive. Such an arrangement is shown in FIG. 6. As can be seen, the torque loop comprised of comparative 60, torque controller 62, and power converter and motor 64 are configured to drive load 66 as was shown and described in connection with FIG. 5. Now however, a speed command signal $N_c$ is compared with the actual shaft speed $N_A$ appearing at the output of load 66 by means of comparator 68. The speed error signal ($N_c-N_A$) produced by comparator 68 is applied to a speed controller 70. The output of speed controller 70 becomes the torque command signal $T_c$ which is applied to the inner torque loop.

In the case of a position controlled drive system, an outer position loop may be superimposed on the speed loop. In the case of such cascaded controlled structures, the output of each control loop serves as a command signal for the next inner loop. With a properly designed torque control loop, the system seen by the outer speed control loop can be approximated by a simple second order system, and the design of the speed controller and position control loop follows classic system principals.

It should be clear that the sensing and derivation of quantities such as actual speed, actual torque, stator frequency, rotor frequency, revolutions per second, and stator voltage and current are well known in the automotive art. These signals are sensed by sensors 35 processed in inverter/processor 36 (FIG. 2) in order to generate the appropriate stator drive signals to optimize traction. For example, among basic induction-motor relationships, it is known that torque is proportional to the square of the voltage squared, and both current and flux are proportionate of the voltage. By varying the voltage or frequency inputs, different values of torque and speed are available as outputs. The torque for either rotor may be adjusted by varying the voltage and frequency in the stator. The torque is adjusted to be proportional to the surface coefficient of friction at tire/wheels 20 and 22. This provides maximum propulsion torque at each wheel. The following five equations are other basic induction motor principals which may be utilized to generate the proper stator signals for optimum traction management:

$$W1=2\pi f_1$$

where Wi is the angular frequency of the supply voltage (i.e. the inverter voltage); i.e., the synchronous angular velocity; and $f_1$ is the stator frequency;

$$W2=2\pi f_2$$

where W2 is the angular frequency of a rotor and $f_2$ is the rotor frequency;

$$Wm=pn$$

where Wm is the shaft angular velocity, p is the number of pole pairs and n equals revolutions per second;

$$\phi=\Phi \sin w1t$$

where $\phi$ is the instantaneous flux and $\Phi$ is the fundamental flux per pole; and $$s=(W1-Wm)/W1$$

where s is the fractional slip.

Since an induction motor is a complex non-linear multivariable control plant, where rotor current cannot be sensed in a caged-rotor machine, an effective high-performance motor drive may incorporate additional control loops for air gap flux, slip frequency and/or stator currents. These inner loops require additional sensing such as flux estimation from the input voltage, slip frequency measurement, and stator current measurement.

Figure 7:
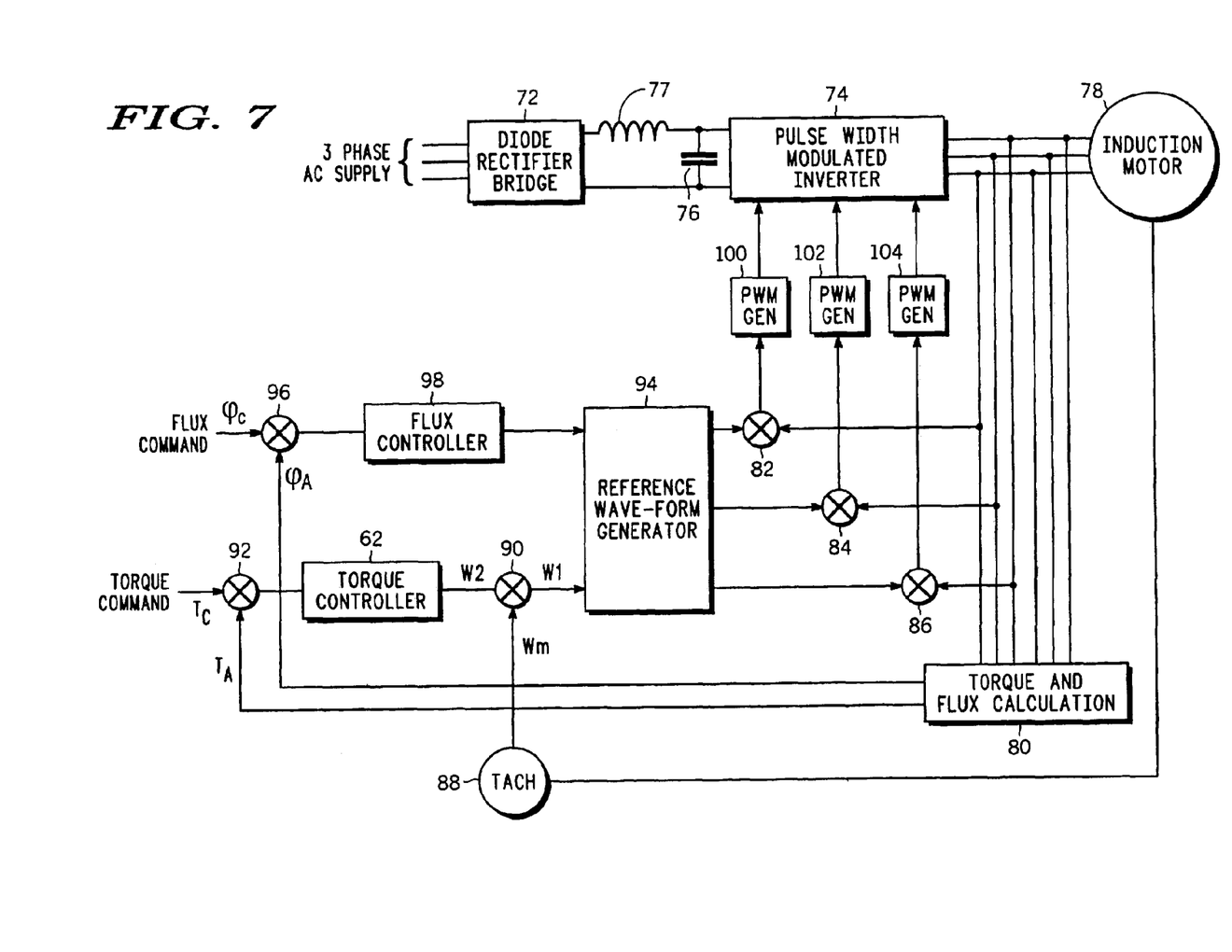
FIG. 7 is a block diagram of an induction motor drive system with independent torque and flux control loops.

Field oriented or vector control provides the key to the operation of the induction motor in a high-performance four-quadrant drive system. The result is a control technique wherein the control of torque and flux is decoupled. In a current control drive system, the specifying of appropriate stator current and slip frequency commands indirectly controls the air gap flux. A high-performance drive system utilizes control of air gap flux and fast response torque control. Therefore, independent torque and flux control loops are desirable as is shown in FIG. 7. This control structure is highly suitable for traction drive in an electric vehicle.

Referring to FIG. 7, the output of a three phase AC supply is applied to a diode rectifier bridge 72 the output of which is coupled to an input of a pulse width modulated inverter 74. Inductor 77 is coupled in series with the first input of pulse width modulated inverter 74. While a three-phase supply and a diode rectifier bridge have been shown, a typical application might include a battery supply or a fuel cell supply of DC power. Capacitor 76 is coupled across the first and second inputs of pulse width modulated inverter 74. The outputs of pulse width modulated inverter 74 are applied to induction motor 78, to a torque and flux calculation unit 80, and individually to first inputs of comparators 82, 84, and 86. An output of induction motor 78 is sensed by a tachometer 88. Tachometer 88 measures the shaft angular velocity $W_m$ and applies it to a first input of comparator 90. As was the case in FIG. 5, torque command signal $T_c$ is applied to a first input of comparator 92 and the actual torque $T_a$ generated at an output of torque and flux calculation unit 80 is applied to a second input of comparator 92. The resulting error signal is applied to torque controller 62 which generates a signal W2 representative of the angular velocity of a rotor. This signal is applied to the second input of comparator 90. The output of comparator 90 corresponding to the angular frequency of the supply voltage is applied to reference wave form generator 94. A flux command signal $\phi_c$ is applied to a first input of comparator 96, and the actual flux $\phi_A$, generated by torque and flux calculation unit 80 is coupled to a second input of comparator 96. The difference signal generated by comparator 96 is applied to an input of flux controller 98 which in turn drives reference waveform generator 94. Reference waveform generator 94 receives the output of flux controller 98 and the angular frequency of the supply voltage as generated by comparator 90 and generates outputs which are respectively applied to second inputs of comparators 82, 84, and 86. The outputs of comparators 82, 84, and 86 are respectfully applied to pulse width modulators 100, 102 and 104 which each in turn generate outputs that are applied to pulse width modulated inverter 74.

While direct sensing of air gap flux is desirable, motor torque calculation and air gap flux calculation may be performed by processor 36 by monitoring the terminal voltages and currents of the motor and supplying these parameters to processor 36. The calculated air gap flux $\phi_a$ is compared with the commanded value $\phi_c$ in comparator 96. The error signal generated by comparator 96 determines the current amplitude command for the reference sine-wave generation in reference waveform generator 94. The torque error generated at the output of comparator 92 is used to specify the slip frequency command that is added to the tachometer signal generated by tachometer 88 in order to determine angular frequency. For optimum performance, the computation of motor torque and air gap flux should be substantially unaffected by variations in machine parameters.

The implementation of field orientation or vector control requires information regarding the magnitude and position of the rotor flux vector. The control action takes place in a field coordinate system using the rotating rotor flux vector as the frame of reference for stator currents and voltages. The transformed stator currents are resolved into direct and quadature axis components that correspond to field and armature currents of a compensated DC motor.

The electric differential of the present invention utilizes the above parameters and processes to deliver an increased amount of applied torque to the drive wheel having better traction. The amount of additional torque is adjusted by selecting the desired bias ratio. This in turn sets the amount of traction available to that wheel. The provision of bias ratio significantly affects the operative connection between drive axles and represents a choice for controlling torque transfers between drive axles to achieve optimum traction. A bias ratio of X:1 means that the electric differential is capable of delivering to the drive wheel having better traction X times the amount of torque which can be supported by the lower traction drive wheel. In comparison with an open differential, this means that under the same conditions, an X:1 bias ratio differential is capable of delivering X/2 times more torque to the drive axles collectively than an open differential. Furthermore, the electric differential can be continuously variable from 2 to as much as 10 depending on the size and current capability of the inverter supply.

The present invention makes it possible to provide for different effective bias ratios for vehicle driving and coasting modes. The electric differential is designed to have little or no effect on vehicle performance unless torque is being transferred by the electric differential. The coasting mode is actually vehicle deceleration caused by engine braking. This mode is most evident with standard shift vehicles during down shifting.

The electric differential of the present invention can provide regenerative braking on demand and be blended with a standard braking system. The regenerative mode can be used for battery charging if required by the overall electrical system management operation. Also, undesirable steering effects associated with downshifting can be substantially eliminated by continuous bias adjustments using the electric differential motors.

Thus, there has been provided an electrical differential traction control drive system which automatically maximizes traction when one or more of a vehicle's drive wheels encounters a split coefficient surface. The inventive system eliminates the need for drive shafts, viscous drives, etc. not only reducing the number of mechanical parts required but also significantly reducing the mass of the system which in turn improves fuel efficiency and vehicle handling. The system performs tractions adjustments in a matter of microseconds from the onset of traction loss, and the adjustments are substantially imperceptible to the operator.

From the foregoing description, it should be appreciated that an electric differential traction control system has been provided which overcomes the deficiencies of other conventional mechanical drive systems and provides several desirable advantages. While the preferred exemplary embodiments have been presented in the foregoing detailed description, it should be appreciated that a vast number of variations in the embodiments exist. It should also be appreciated that this preferred embodiment is only an example, and is not intended to limit the scope, applicability, or configuration of the invention in any way. Rather, the foregoing detailed description provides those skilled in the art with a convenient road map for implementing a preferred exemplary embodiment of the invention. It should be understood that various changes may be made in the function and arrangement of elements described in the exemplary preferred embodiment without departing from the spirit and scope of the invention as set for in the appended claims.

What is claimed is:

1. A motor, comprising:
   a common stator having a cavity formed therethrough;
   a first rotor at least partially disposed within said cavity, said first rotor differentially driven by said common stator; and
   a second rotor at least partially disposed within said cavity and capable of independent rotation with respect to said first rotor, said second rotor differentially driven by said common stator.

2. A motor according to claim 1 wherein said common stator includes a single winding for activating said first and second rotors.

3. A motor according to claim 1 wherein said common stator comprises first and second windings for driving said first and second rotors respectively.

4. An electric drive system, comprising:
   first means for producing electrical energy;
   a first and a second drive wheels; and
   a motor, comprising;
      a common stator having a cavity formed therethrough;
      a first rotor for driving said first drive wheel, said first rotor disposed at least partially within said cavity;
      a second rotor for driving said second drive wheel, said second rotor disposed at least partially within said cavity, said first and second rotors capable of independent relative rotation; and
      generating means for driving said first and second rotors coupled to said common stator.

5. An electric drive system according to claim 4 wherein said common stator includes a single winding for energizing said first and second rotors.

6. An electric drive system according to claim 4 wherein said common stator comprises first and second windings for driving said first and second rotors respectively.

7. An electric drive system according to claim 4 wherein said first means is an inverter.

8. An electric drive system according to claim 4 further comprising a processor coupled to said inverter for altering the torque applied to one said first and second rotors relative to the other of said first and second rotors.

9. An electric drive system according to claim 8 further comprising second means for sensing the torque applied to each of said first and second drive wheels.

10. An electric drive system according to claim 8 comprising second means for sensing the speed of each of said first and second drive wheels.

11. An electric drive system according to claim 9 wherein said second means comprises a closed loop torque controller.

12. An electric drive system according to claim 10 wherein said second means comprises a closed loop speed controller.

13. An electric drive system, comprising:
   at least first and second drive wheels;
   a motor comprising:
      a common stator having a cavity formed therethrough;
      a first rotor for driving said first drive wheels, said first rotor disposed at least partially in said cavity of said common stator;
      a second rotor for driving said second drive wheels, said second rotor disposed at least partially in said cavity of said common stator, said first and second rotors capable of independent relative rotation; and
      generating means for driving said first and second rotors coupled to said common stator;
   a processor coupled to said motor; and
   at least one sensor mechanism coupled to said processor for providing at least a first operational parameter to said processor for altering the operation of said motor to improve traction of at least one of said first and second drive wheels.

14. An electric drive system according to claim 13 wherein said first operational parameter is torque.

15. An electric drive system according to claim 13 wherein said first operational parameter is speed.

16. An electric drive system according to claim 13 wherein said common stator includes a single winding for energizing said first and second rotors.

17. An electric drive system according to claim 13 wherein said common stator comprises first and second windings for driving said first and second rotors respectively.

18. An electric drive system according to claim 14 wherein said at least one sensor mechanism comprises a closed loop torque controller.

19. An electric drive system according to claim 15 wherein said at least one sensor mechanism comprises a closed loop speed controller.

20. A motor, comprising:
   a common stator having an inner surface defining a cavity;
   a first rotor shaft at least partially disposed within the cavity;
   a first rotor rotationally coupled to the first rotor shaft;
   a second rotor shaft at least partially disposed within the cavity:
   a second rotor rotationally coupled to the second rotor shaft and configured to rotate independently with respect to the first rotor.

21. An electric drive system, comprising:
   a motor comprising;
      a common stator having an inner surface defining a cavity;
      a first rotor shaft at least partially disposed within the cavity;
      a first rotor rotationally coupled to the first rotor shaft;
      a second rotor shaft at least partially disposed within the cavity;
      a second rotor rotationally coupled to the second rotor shaft and configured to rotate independently with respect to the first rotor; and
   first and second drive wheels coupled to the first and second drive shafts, respectively; and
   an electric power source coupled to the common stator to thereby drive the first and second rotors.

* * * * *